(12) United States Patent
Hughes

(10) Patent No.: US 7,044,759 B2
(45) Date of Patent: May 16, 2006

(54) AUTOMATICALLY DISCONNECTING PLUG AND METHOD OF TRIGGERING DISCONNECTION OF AN AUTOMATICALLY DISCONNECTING PLUG

(76) Inventor: Stephen James Hughes, 18015 - 84 Avenue NW, Edmonton, AB (CA) T5T 0V6

( * ) Notice: Subject to any disclaimer, the term of this patent is extended or adjusted under 35 U.S.C. 154(b) by 111 days.

(21) Appl. No.: 10/872,630

(22) Filed: Jun. 21, 2004

(65) Prior Publication Data

US 2004/0266236 A1 Dec. 30, 2004

(30) Foreign Application Priority Data

Jun. 25, 2003 (CA) .................................... 2433380

(51) Int. Cl.
*H01R 13/62* (2006.01)
(52) U.S. Cl. ..................................... 439/180
(58) Field of Classification Search ............... 439/180, 439/188–189, 140–141, 441, 646, 159, 638, 439/152; 174/53; 361/98–99, 170, 187, 361/205; 307/149, 125–141; 200/51 R, 200/51
See application file for complete search history.

(56) References Cited

U.S. PATENT DOCUMENTS

| 2,076,136 A | 4/1937 | Weed |
| 2,235,262 A | 3/1941 | Miller |
| 2,688,734 A | 9/1954 | Welling |
| 2,748,359 A | 5/1956 | Swan |
| 2,955,273 A | 10/1960 | Winkler |
| 3,118,713 A | 1/1964 | Ellis |
| 3,431,428 A | 3/1969 | van Valer |
| 3,475,715 A | 10/1969 | Venaleck |
| 4,045,106 A | 8/1977 | Borg |
| 4,114,969 A | 9/1978 | Borg |
| 4,138,177 A | 2/1979 | van Valer |
| 4,140,259 A | 2/1979 | Kostka et al. |
| 4,157,855 A | 6/1979 | Chan |
| 4,176,899 A | 12/1979 | Betts |
| 4,314,735 A | 2/1982 | Fullenkamp et al. |
| 4,340,267 A | 7/1982 | Nukaga |
| 4,514,715 A | 4/1985 | Chen |
| 4,586,768 A | 5/1986 | Eck |
| 4,615,241 A | 10/1986 | Grabarski et al. |
| 4,730,089 A | 3/1988 | Pepper |
| 4,850,886 A | 7/1989 | Berke |
| 4,893,037 A | 1/1990 | Schwartz |
| 4,907,981 A | 3/1990 | Gallusser et al. |
| 4,928,520 A | 5/1990 | Barrington |
| 5,034,571 A | 7/1991 | Galloway |
| 5,040,603 A | 8/1991 | Baldridge |
| 5,211,569 A | 5/1993 | Havens |
| 5,266,040 A | 11/1993 | Merrill et al. |
| 5,293,296 A | 3/1994 | Carl |
| 5,388,749 A | 2/1995 | Davignon et al. |
| 5,645,439 A | 7/1997 | Nugent, Jr. et al. |

(Continued)

*Primary Examiner*—J. F. Duverne
(74) *Attorney, Agent, or Firm*—Christensen O'Connor Johnson Kindness PLLC

(57) ABSTRACT

An automatically disconnecting plug has a rotatable drive member with a threaded central aperture. A threaded shaft extends through the central aperture. An electrically conductive coupling member is carried by the shaft. Upon rotation of the drive member, the coupling member is disconnected by being carried by the shaft into the interior cavity of the housing.

6 Claims, 8 Drawing Sheets

U.S. PATENT DOCUMENTS

| | | |
|---|---|---|
| 5,800,189 A | 9/1998 | Ahmed |
| 5,831,802 A | 11/1998 | Ahmed et al. |
| 5,967,231 A | 10/1999 | Laurel et al. |
| 6,113,376 A | 9/2000 | Eppich |
| 6,364,675 B1 | 4/2002 | Brauer et al. |
| 6,540,533 B1 | 4/2003 | Schreiber |
| 6,770,986 B1 * | 8/2004 | Nagao et al. ............... 307/326 |
| 6,773,283 B1 * | 8/2004 | Yoshimatsu et al. ........ 439/180 |
| 6,799,984 B1 * | 10/2004 | Starta et al. ................. 439/246 |
| 6,893,284 B1 * | 5/2005 | Fawcett et al. .............. 439/348 |

\* cited by examiner

AUTOMATICALLY DISCONNECTING PLUG AND METHOD OF TRIGGERING DISCONNECTION OF AN AUTOMATICALLY DISCONNECTING PLUG

FIELD OF THE INVENTION

The present invention relates to an automatically disconnecting plug and a method of triggering disconnection of an automatically disconnecting plug in a motor vehicle.

BACKGROUND OF THE INVENTION

There are numerous patents relating to automatically disconnecting plugs. These disconnecting plugs differ in their structure and in strategies implemented through associated electrical ejecting circuits to cause the plug to disconnect upon the happening of a predetermined triggering event.

U.S. Pat. No. 4,045,106 (Borg 1977) discloses a male plug which has projecting prongs that are movable between an extended position and a retracted position. The prongs are spring biased to assume the retracted position, but are maintained in the extended position by a locking mechanism. Upon the triggering event occurring the locking mechanism is released and the prongs move to the retracted position, retracting from a female plug with which it is coupled. U.S. Pat. No. 5,645,439 (Nugent Jr. 1997) discloses a male plug which has an ejecting pin movable between an extended and a retracted position. The ejecting pin is spring biased to assume the extended position, but is maintained in the retracted position by a locking mechanism. Upon the triggering event occurring the locking mechanism is released and the ejecting pin moves to the extended position pushing a female plug end out of engagement with the male plug.

U.S. Pat. No. 5,831,802 (Ahmed et al 1998) teaches one skilled in the art to provide an energizing current to the ejecting circuit upon a substantial cessation of current flow by an appliance. U.S. Pat. No. 6,540,533 (Schreiber 2003) teaches one skilled in the art to monitor electrical power supply characteristics and provide an energizing current to the ejecting circuit when a predetermined sequence in rapid changes in electrical power supply characteristics are sensed.

In cold weather climates, motor vehicles are equipped with electric block heaters. These block heaters are plugged in when the vehicle is not in use. A problem commonly encountered is that of motor vehicle operators driving away without unplugging their block heaters.

SUMMARY OF THE INVENTION

What is required is an automatically disconnecting plug suitable for use with motor vehicles and a method of triggering disconnection of an automatically disconnecting plug such applications.

According to the present invention there is provided an automatically disconnecting plug which includes a housing having an interior cavity with an access opening. A drive member is rotatably mounted within the interior cavity. The drive member has a central aperture defined by a threaded circumferential sidewall having interior threads. A threaded shaft is provided having exterior threads, a first end and a second end. The shaft extends through the central aperture of the drive member, with the exterior threads engaging the interior threads of the threaded circumferential sidewall. Rotation of the drive member in a first rotational direction causes axial movement of the threaded shaft in a first direction toward the access opening. Rotation of the drive member in a second rotational direction causes axial movement of the threaded shaft in a second direction away from the access opening. An electrically conductive first coupling member is carried by the first end of the threaded shaft. The first coupling member is adapted to mate with an external mating second coupling member. A drive mechanism is provided for selectively rotating the drive member upon a selected triggering event occurring, whereby the first coupling member is carried by the shaft in the second direction away from the access opening and into the interior cavity of the housing and out of engagement with the second coupling member. A stop is provided on the housing which is adapted to prevent the second coupling member from being drawn into the housing along with the first coupling member.

With the above described automatic disconnecting plug, a positive drive is provided by drive member to move the threaded shaft. This is viewed as being a more reliable than the use of a biasing spring, as the biasing force of biasing springs tend to diminish over prolonged use.

According to another aspect of the present invention there is provided a method of triggering disconnection of an automatically disconnecting plug. The method involves coupling of the automatically disconnecting plug to a selected electrical circuit from an electrical system of a motor vehicle. The energizing of the selected electrical circuit serves to trigger disconnection by the automatically disconnecting plug. The selected electrical circuit remains dormant upon an engine of the motor vehicle being started without the vehicle being placed in motion. A further step is required by an operator of the motor vehicle in order to energize the selected electrical circuit and thereby trigger disconnection by the automatically disconnecting plug.

If one were to follow the teaching in the prior art, the triggering event for the automatically disconnecting plug would be the starting of the motor vehicle or turning off power being supplied to a block heater in the motor vehicle. Neither of these two triggering events is desirable. In order for the automatically disconnecting plug to be compatible with the use of remote car starters, it is preferable that merely starting the motor vehicle does not result in the disconnection of the plug. In order to be compatible with power saving devices that intermittently supply power to the block heater at timed intervals, it is preferable that the disconnection of the plug not be triggered by the disruptions in the power supply. Once the teachings of the present invention are understood there are a number of ways the invention may be successfully implemented. It is not practical to describe every way of implementing the invention, so only a few examples will hereinafter be described. By tying the triggering event to the electrical circuit involving the seat belt buzzer, the system can be configured so that the automatically disconnecting plug does not disconnect until the operator sits in a driver's seat of the motor vehicle. If it is desired that the operator be able to sit in the driver's seat while the vehicle is idling without the plug disconnecting, the system can be configured so that the operator must sit in the driver's seat of the motor vehicle and do up a seat belt associated with the driver's seat. An alternative approach would be to disconnect the plug only when the operator moves a gear shift lever to a selected triggering position, such as placing the motor vehicle in gear in preparation for movement.

BRIEF DESCRIPTION OF THE DRAWINGS

These and other features of the invention will become more apparent from the following description in which reference is made to the appended drawings, the drawings are for the purpose of illustration only and are not intended to in any way limit the scope of the invention to the particular embodiment or embodiments shown, wherein.

DETAILED DESCRIPTION OF THE PREFERRED EMBODIMENT

Figure 1:
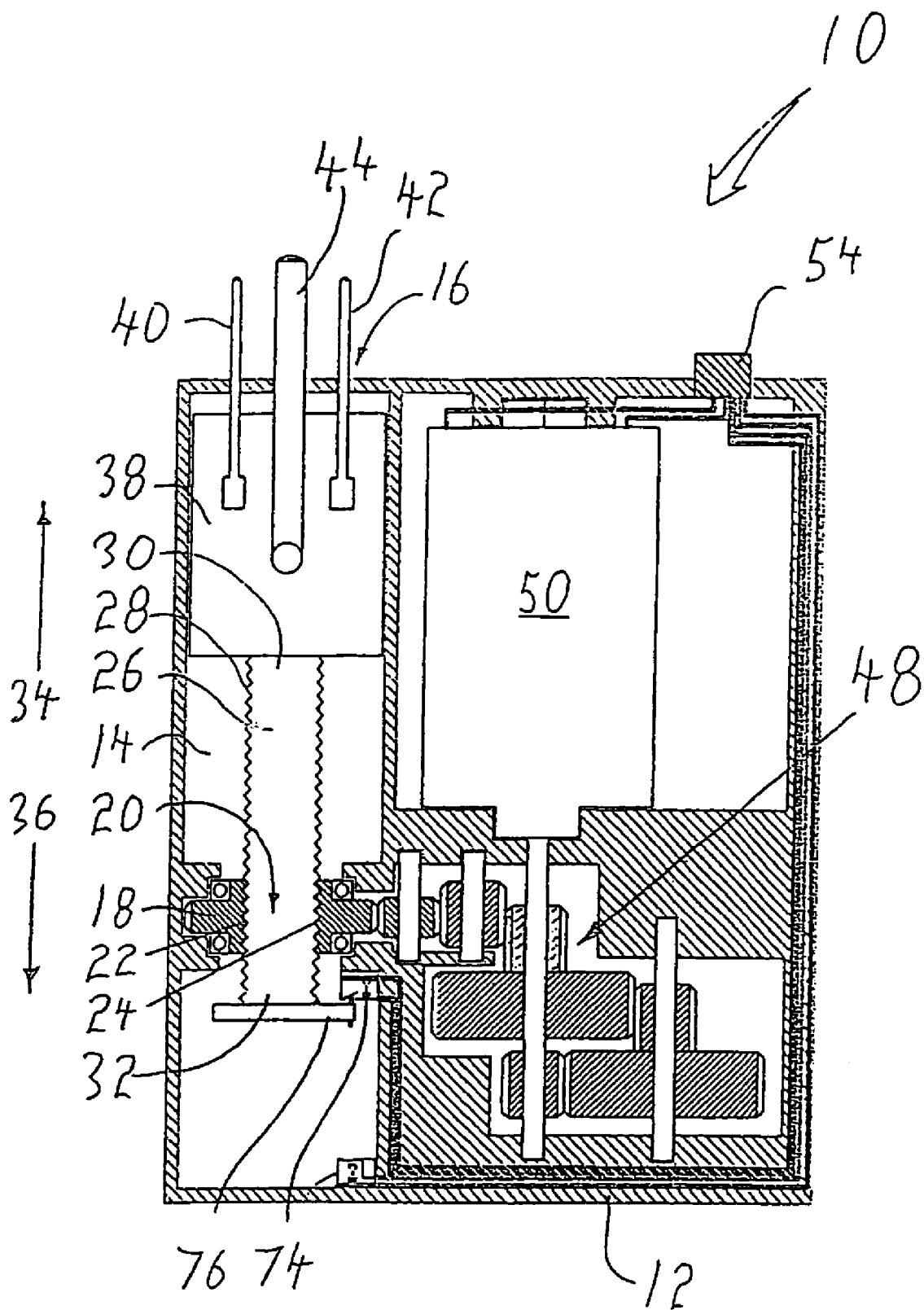
FIG. 1 is a top plan view, in section, of an automatically disconnecting plug constructed in accordance with the teachings of the present invention.

The preferred embodiment, an automatically disconnecting plug generally identified by reference numeral 10, will now be described with reference to FIGS. 1 through 8.

Figure 3A:
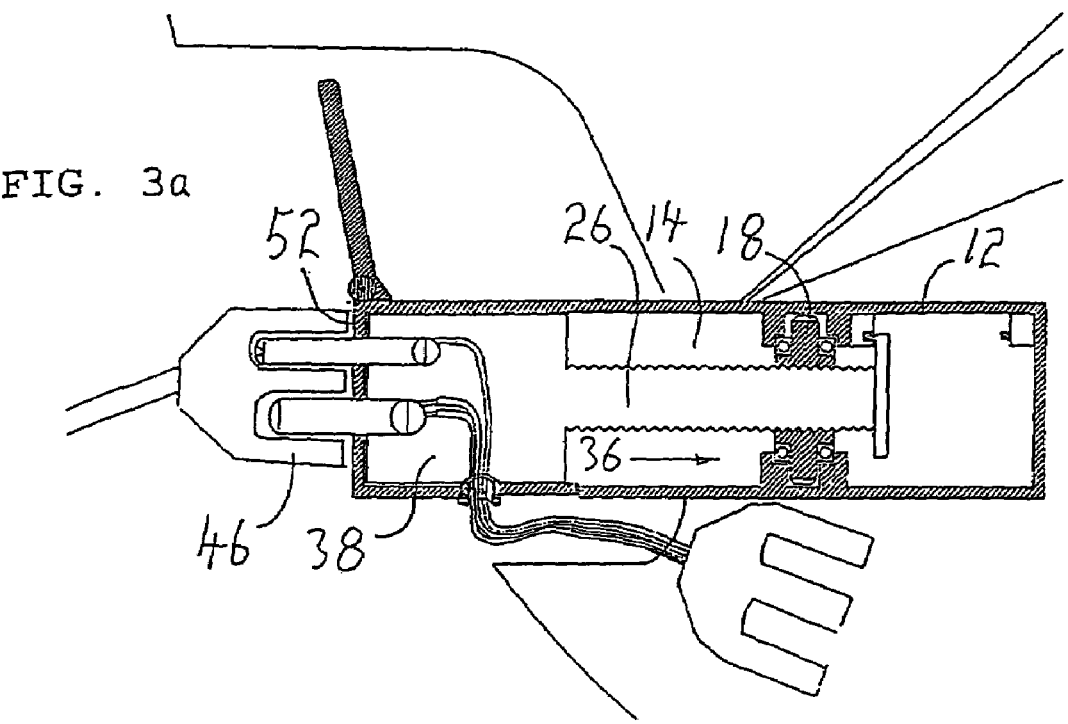
FIG. 3a is a side elevation view, in section, of the automatically disconnecting plug illustrated in FIG. 1 where an outlet is engaged.

Structure and Relationship of Parts:

Referring to FIG. 1 automatically disconnecting plug 10 has a housing 12 having an interior cavity 14 with an access opening 16. A drive member 18 is rotatably mounted within interior cavity 14. Drive member 18 has a central aperture 20 defined by a threaded circumferential sidewall 22 having interior threads 24. A threaded shaft 26 having exterior threads 28, a first end 30 and a second end 32 extends through central aperture 20 of drive member 18. Exterior threads 28 engage interior threads 24 of threaded circumferential sidewall 22 such that rotation of drive member 18 in a first rotational direction causes axial movement of threaded shaft 26 in a first direction 34 toward access opening 16 and rotation of drive member 18 in a second rotational direction causes axial movement of threaded shaft 26 in a second direction 36 away from access opening 16. An electrically conductive first coupling member 38 is carried by first end 30 of threaded shaft 26. In the illustrated embodiment, first coupling member 38 is adapted with a positive prong 40, a negative prong 42 and a ground prong 44. Referring to FIG. 3a, first coupling member 38 is adapted to mate with a similarly adapted external mating second coupling member 46 in a male-female engagement. Referring to FIG. 1, an interlocking gear drive mechanism 48 driven by a motor 50 engages and motivates drive member 18 upon a selected triggering event occurring.

Figure 3B:
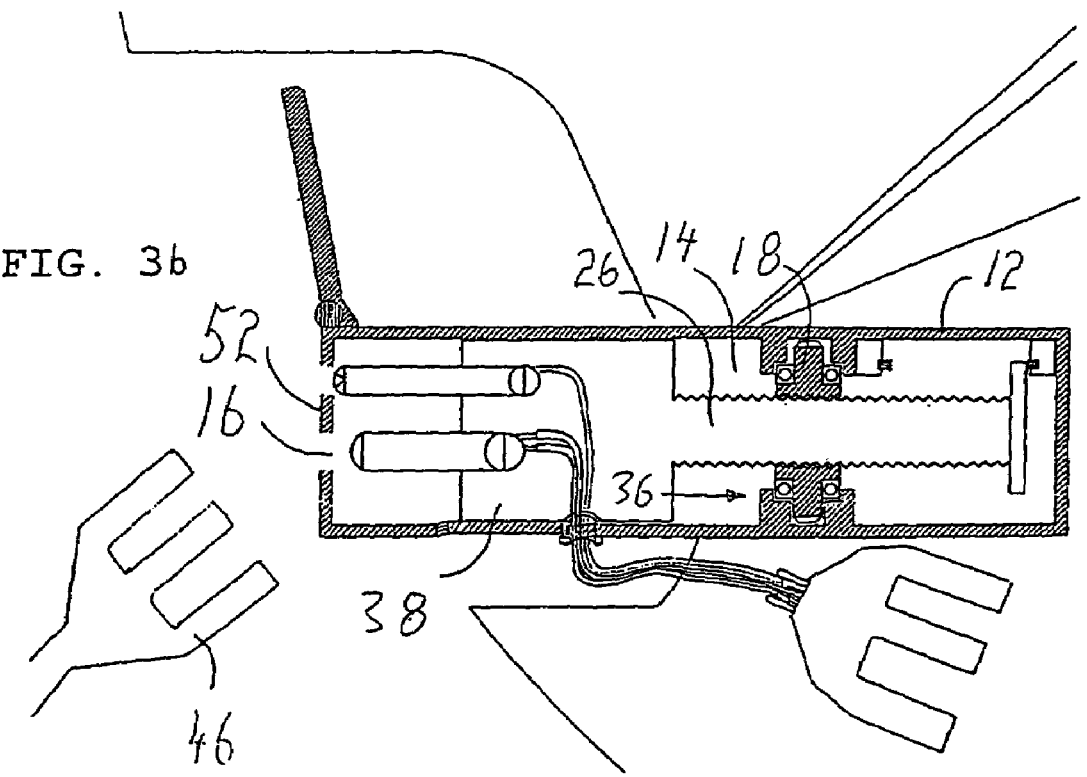
FIG. 3b is a side elevation view, in section, of the automatically disconnecting plug illustrated in FIG. 1 where an outlet is disengaged.

Referring to FIGS. 3a and 3b, upon the triggering event, first coupling member 38 is carried by shaft 26 in second direction 36 away from access opening 16 into interior cavity 14. A stop 52 is positioned between first coupling member 38 and second coupling member 46. As first coupling member 38 moves away from access opening 16, stop 52 blocks second coupling member 46 from being drawn into housing 12, disengaging it from first coupling member 38.

Figure 2A:
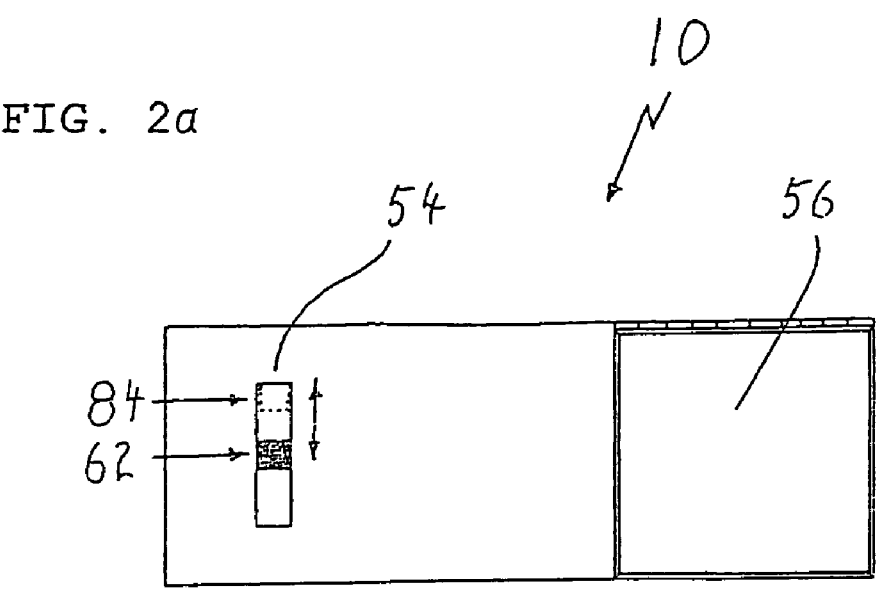
FIG. 2a is a front elevation view of the automatically disconnecting plug illustrated in FIG. 1 where the cover is closed.
Figure 2B:
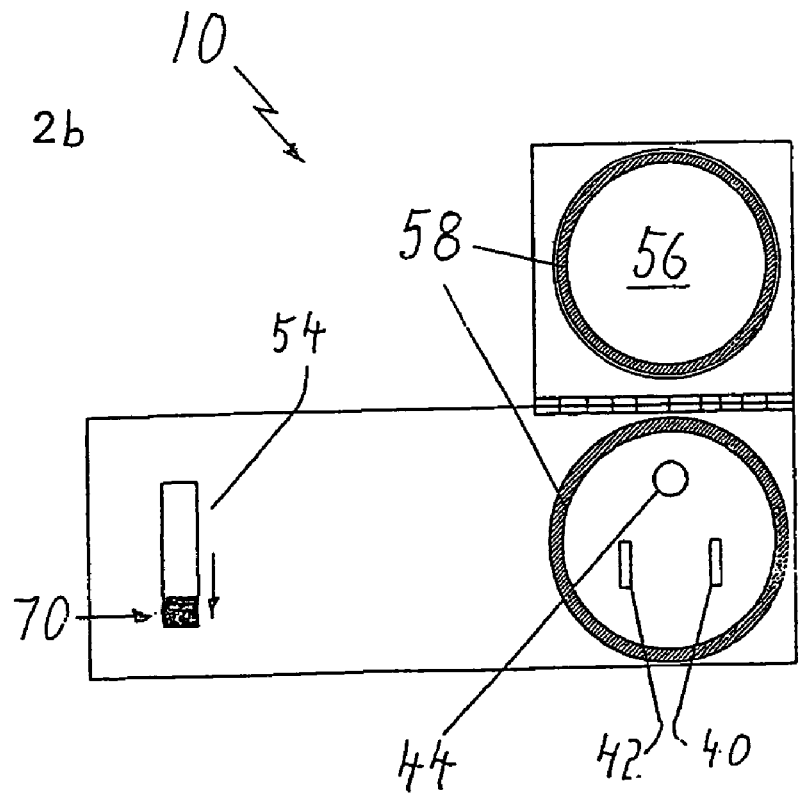
FIG. 2b is a front elevation view of the automatically disconnecting plug illustrated in FIG. 1 where the cover is open.
Figure 4:
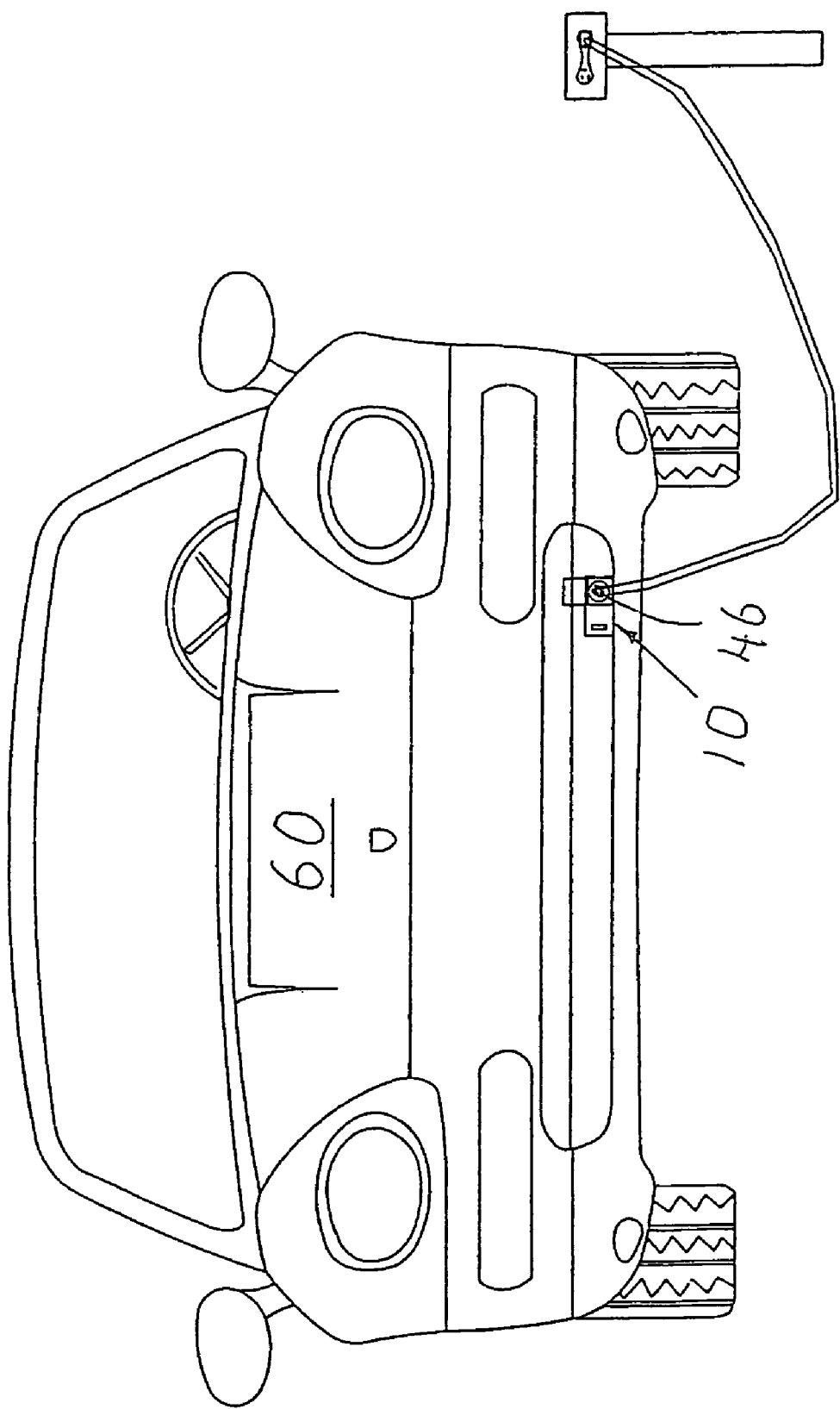
FIG. 4 is a front elevation view of a vehicle with an automatically disconnecting plug in use.
Figure 5:
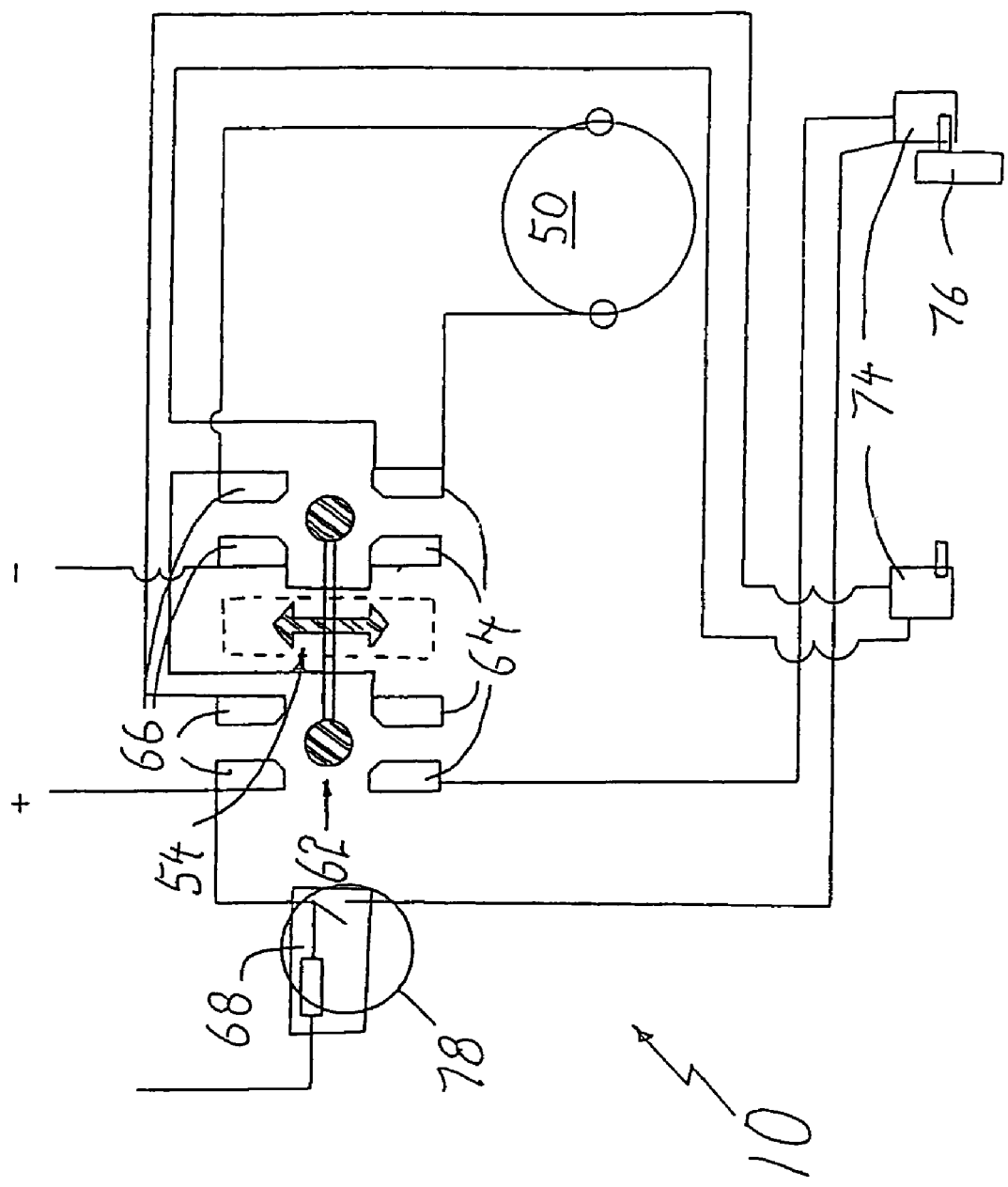
FIG. 5 is a wiring diagram of the automatically disconnecting plug illustrated in FIG. 1 in a first inactive position.
Figure 6:
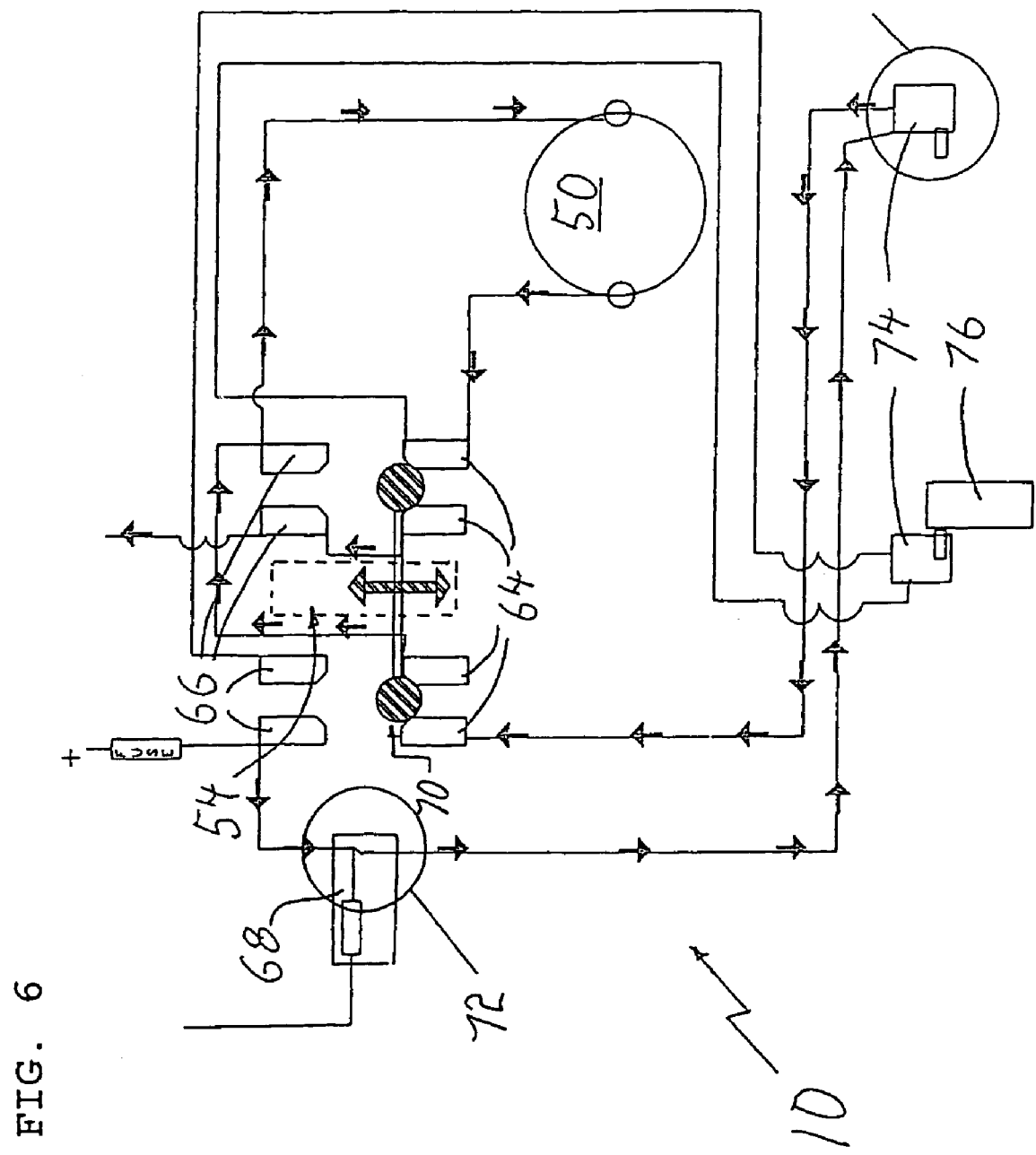
FIG. 6 is a wiring diagram of the automatically disconnecting plug illustrated in FIG. 1 in a second active position.

Operation:

The use and operation of an automatically disconnecting plug 10 and the preferred method of triggering disconnection of an automatically disconnecting plug will now be described with reference to FIGS. 1 through 8. Referring to FIG. 2a, plug 10 is provided with a user operable switch 54 and a cover 56 (shown closed). Referring to FIG. 2b, in the illustrated embodiment, cover 56 (shown open) has a magnetic seal 58 that protects access opening 16 from dust and debris. Referring to FIG. 4, plug 10 is mounted on a motor vehicle 60. An operator/driver engages second coupling member 46 to plug 10 for operation of a block heater, air conditioning unit or other accessory. Referring to FIG. 2a, user switch 54 is in a first inactive position 62. When user switch 54 is in first inactive position 62, first coupling member 38 will be left either extended in first direction 34 or retracted in second direction 36. Referring to FIG. 1, in the illustrated embodiment, positive prong 40, negative prong 42 and ground prong 44 are extended through access opening 16 when first coupling member 38 is in first inactive position 62. Referring to FIG. 5, where user switch 54 is in first inactive position 62, both first internal contacts 64 and second internal contacts 66 are not bridged. A relay switch 68 provides power to first internal contacts 64. However, even if relay switch 68 is closed, no current flows; plug 10 remains inactive so long as user switch 54 remains in first inactive position 62. Referring to FIG. 2b, in order to 'arm' plug 10, an operator/driver will move user switch 54 to a second active position 70. Referring to FIG. 6, where user switch 54 is in second active position 70 and where relay 68 is in a closed position 72, first internal contacts 64 are closed and current may flow (arrows) to motor 50. Referring to FIG. 1, current activates drive mechanism 48, drive member 18 and shaft 26, retracting first coupling member 38 into cavity 14. A configuration of opposed circuit breakers 74 switched by a contact arm 76 at second end 32 of shaft 26 switches power off when shaft 26 is finished movement in either first direction 34 or second direction 36. However, referring to FIG. 5, relay 68 is in an open position 78. Until current is supplied through relay switch 68, plug 10 remains dormant.

Figure 7:
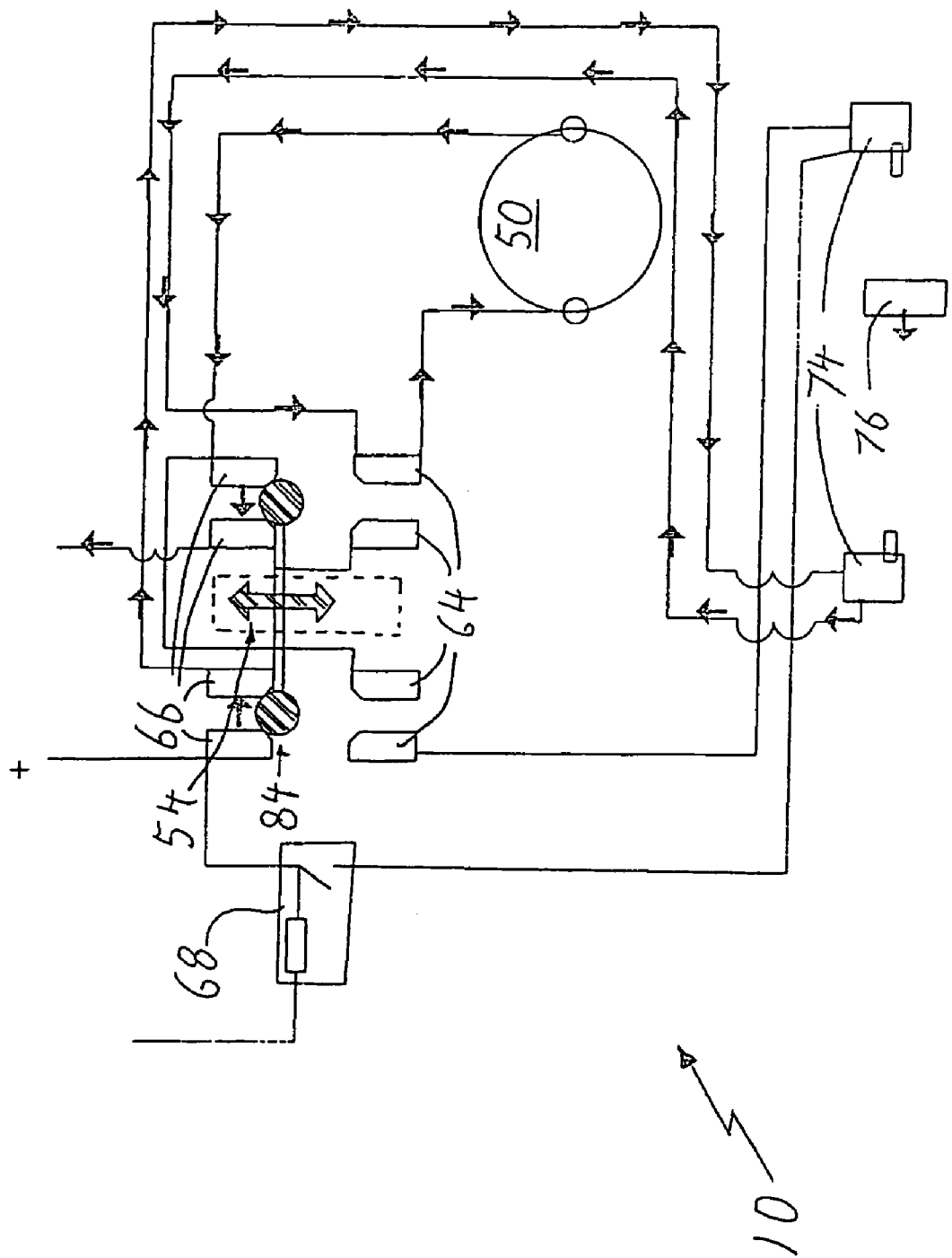
FIG. 7 is a wiring diagram of the automatically disconnecting plug illustrated in FIG. 1 in a third reset position.
Figure 8:
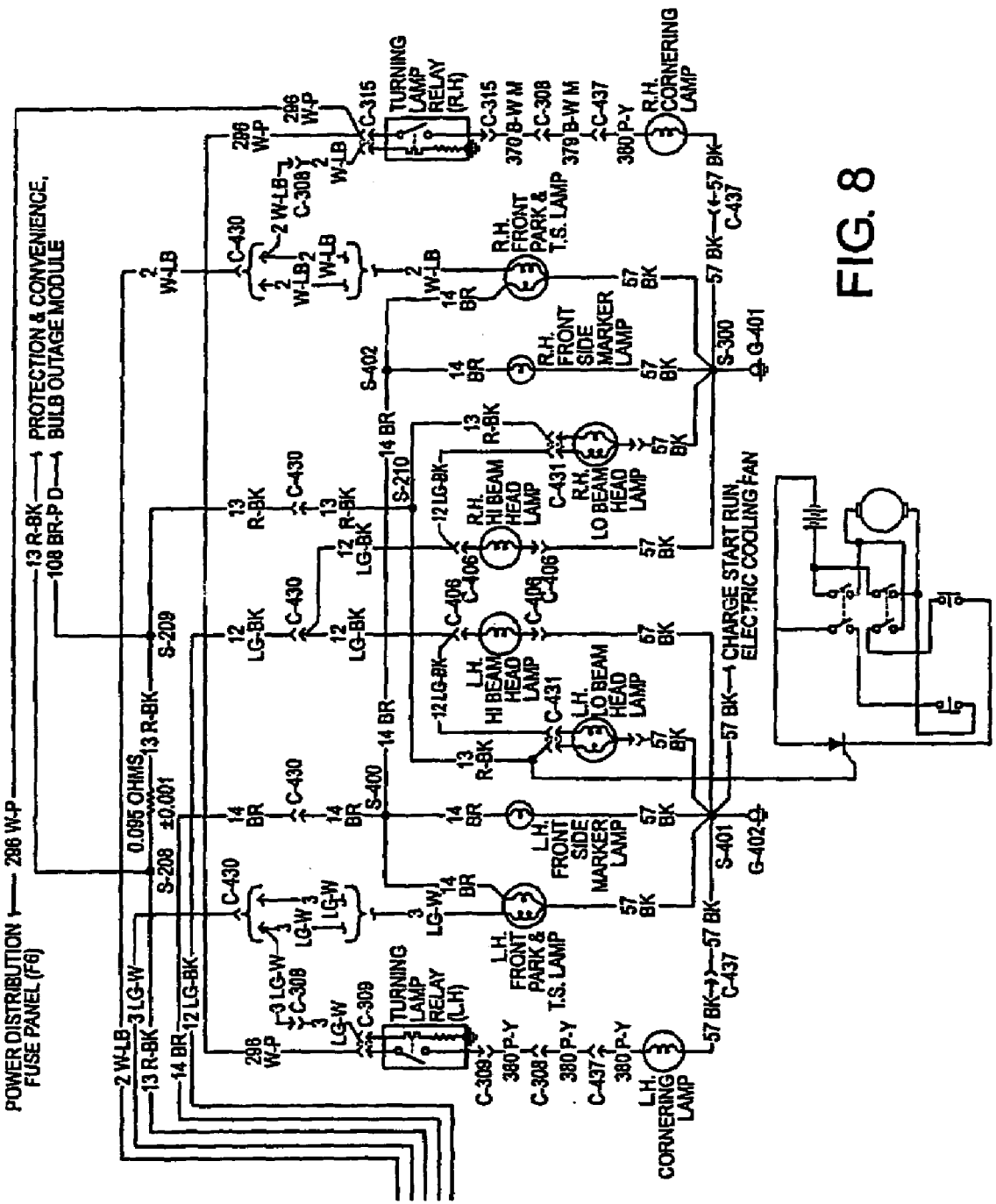
FIG. 8 is a wiring diagram illustrating the automatically disconnecting plug wired into a select electrical circuit of a motor vehicle electrical system.

Referring to FIG. 8, according to the teachings of the preferred method, a first step is to electrically couple plug 10 at relay switch 68 to a selected electrical circuit 80 from the electrical system 82 of motor vehicle 60. Electrical circuit 80 is selected as one that remains dormant even when the engine of motor vehicle 60 is started. In the illustrated embodiment, select electrical circuit 80 is the daytime driving lights. On the particular model illustrated, daytime driving lights are only activated by placing the vehicle in gear. A further step involves the operator/driver energizing selected electrical circuit 80 by activating the gear shift lever of motor vehicle 60, energizing the daytime driving lights thereby triggering disconnection of automatically disconnecting plug 10 as described above. Where user switch 54 is in second active position 70, current from the newly activated selected electrical circuit 80 triggers relay 68 to activate plug 10. Referring to FIG. 2a, where an operator/ driver wishes to re-set plug 10, he/she moves user switch 54 to a third re-set position 84. Referring to FIG. 7, user switch 54 now engages second internal contacts 66 which are 'hot wired'. Current flow is now available to reverse motor 60. There is no need for current to be routed through relay 68, it can be in open position 72 as shown. Referring to FIG. 2a, when user switch 54 is put in third re-set position 84, it is automatically biased back to first inactive position 62 once first coupling member 38 is extended fully in first direction 34 and positive prong 40, negative prong 42 and ground prong 44 are re-extended through access opening 16. Upon release of user switch 54, it returns to first inactive position 62 and plug 10 is again left dormant.

With automatically disconnecting plug 10, as described above, the plug is only disconnected when the daytime driving lights come on. The daytime driving lights only come on when the driver of the vehicle moves the gear shift with the intent of placing the vehicle in motion. This enables the vehicle to be turned on and off by a remote car starter, without prematurely triggering automatically disconnecting plug 10. It also enables power to be supplied to the block heater through a timer, without prematurely triggering automatically disconnecting plug 10 as power is turned on or off. The system reliably disconnects the plug, so a driver does not drive off while still connected. The actual disconnection is accomplished through axial movement of the shaft by the drive member. There is no need to worry about failure due to worn or frozen springs, as there is with equivalent prior art automatically disconnecting plugs.

Variations:

Other choices for a selected triggering event and selected electrical circuit 80 may involve the operator sitting in a driver's seat of the motor vehicle, the operator doing up a seat belt associated with the driver's seat or the operator selecting a specific gear or option of the motor vehicle. It will be appreciated that couplings to a motor vehicles electrical system may vary depending on the make, year and model of the motor vehicle.

In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be one and only one of the elements.

It will be apparent to one skilled in the art that modifications may be made to the illustrated embodiment without departing from the spirit and scope of the invention as hereinafter defined in the claims.

The embodiments of the invention in which an exclusive property or privilege is claimed are defined as follows:

1. An automatically disconnecting plug, comprising:
   a housing having an interior cavity with an access opening;
   a drive member rotatably mounted within the interior cavity, the drive member having a central aperture defined by a threaded circumferential sidewall having interior threads;
   a threaded shaft having exterior threads, a first end and a second end, the shaft extending through the central aperture of the drive member with the exterior threads engaging the interior threads of the threaded circumferential sidewall, such that rotation of the drive member in a first rotational direction causes axial movement of the threaded shaft in a first direction toward the access opening and rotation of the drive member in a second rotational direction causes axial movement of the threaded shaft in a second direction away from the access opening;
   an electrically conductive first coupling member carried by the first end of the threaded shaft, the first coupling member being adapted to mate with an external mating second coupling member;
   a drive mechanism for selectively rotating the drive member upon a selected triggering event occurring, whereby the first coupling member is carried by the shaft in the second direction away from the access opening and into the interior cavity of the housing and out of engagement with the second coupling member; and
   a stop on the housing which is adapted to prevent the second coupling member from being drawn into the housing along with the first coupling member.

2. The automatically disconnecting plug as defined in claim 1, in combination with a selected electrical circuit from an electrical system of a motor vehicle, such that energizing of the selected electrical circuit serves to trigger disconnection by the automatically disconnecting plug, the selected electrical circuit remaining dormant upon an engine of the motor vehicle being started without being placed in motion, a further step being required by an operator of the motor vehicle in order to energize the selected electrical circuit and thereby trigger disconnection by the automatically disconnecting plug.

3. A method of triggering disconnection of an automatically disconnecting plug, comprising the step of:
   coupling the automatically disconnecting plug to a selected electrical circuit from an electrical system of a motor vehicle, such that energizing of the selected electrical circuit serves to trigger disconnection by the automatically disconnecting plug, the selected electrical circuit remaining dormant upon an engine of the motor vehicle being started without the vehicle being placed in motion, a further step being required by an operator of the motor vehicle in order to energize the selected electrical circuit and thereby trigger disconnection by the automatically disconnecting plug.

4. The method as defined in claim 3, the further step by the operator involving the operator sitting in a driver's seat of the motor vehicle.

5. The method as defined in claim 3, the further step by the operator involving the operator sitting in a driver's seat of the motor vehicle and doing up a seat belt associated with the driver's seat.

6. The method as defined in claim 3, the further step by the operator involving moving a gear shift lever to a selected triggering position.

* * * * *